July 13, 1954 B. W. ROGERS 2,683,384
DUAL CRANKSHAFT POWER DELIVERY ARRANGEMENT
Filed Nov. 2, 1949 3 Sheets-Sheet 1

Inventor
Bradford W. Rogers
By *Clarence A. O'Brien
and Harvey B. Jackson*
Attorneys July 13, 1954  B. W. ROGERS  2,683,384
DUAL CRANKSHAFT POWER DELIVERY ARRANGEMENT
Filed Nov. 2, 1949  3 Sheets-Sheet 2

Inventor
Bradford W. Rogers
By Clarence A. O'Brien
and Harvey B. Jacobson
Attorneys July 13, 1954  B. W. ROGERS  2,683,384
DUAL CRANKSHAFT POWER DELIVERY ARRANGEMENT
Filed Nov. 2, 1949  3 Sheets-Sheet 3
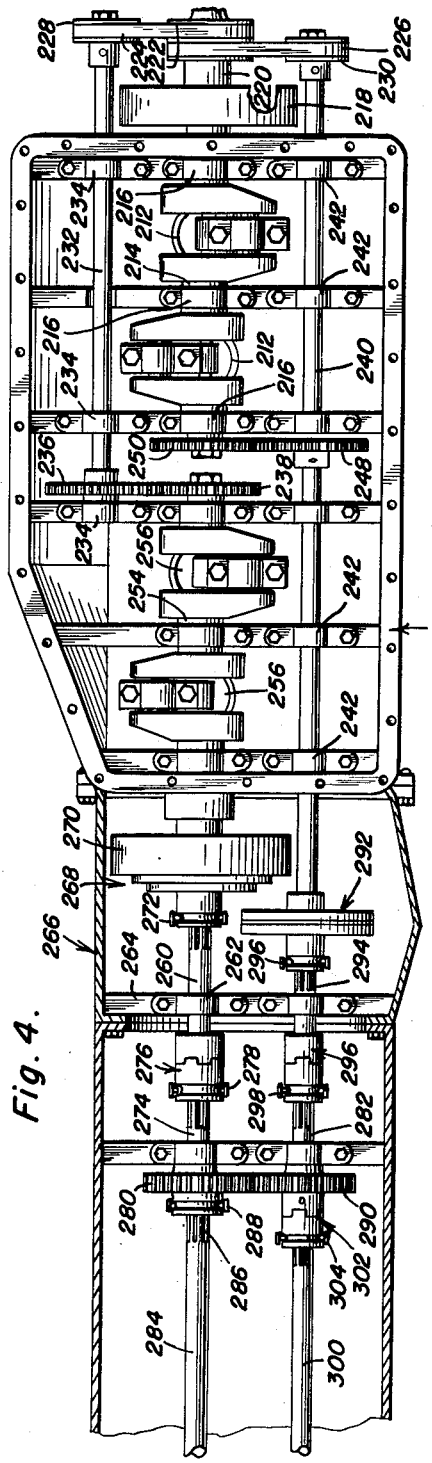
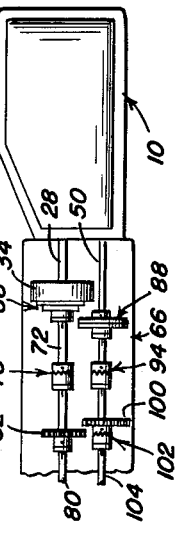
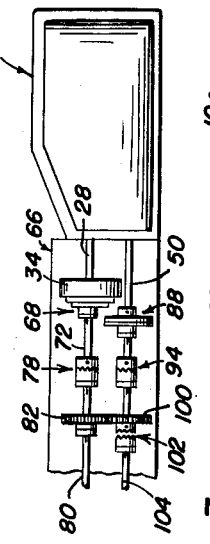
Inventor
Bradford W. Rogers Patented July 13, 1954

2,683,384

UNITED STATES PATENT OFFICE 2,683,384

DUAL CRANKSHAFT POWER DELIVERY ARRANGEMENT

Bradford W. Rogers, Oconomowoc, Wis.

Application November 2, 1949, Serial No. 124,983

1 Claim. (Cl. 74—665)

This invention relates to improvements in internal combustion engines.

An object of this invention is to supply torque to a drive shaft and a power shaft from a first and a second crankshaft, said crankshaft, drive shaft and power shaft being arranged so that the drive shaft may derive its torque from both of the crankshafts or one of the crankshafts, as desired, and so that the power shaft may be operated with said drive shaft or be rendered inoperative.

Another object of this invention is to deliver torque to the drive shaft and power shaft as described above and by such an arrangement of clutches that the drive shaft may be rendered ineffectual and the power shaft may be operated by one or both of said crankshafts.

Another object of this invention is to conserve space by providing a single cylinder block with a pair of groups of cylinders and two crankshafts, one crankshaft being operatively connected with one group of pistons, while the other crankshaft is operatively connected with the other group of pistons, whereby from casual inspection the engine appears to be a single engine, however, the crankshafts being so aranged as to be capable of delivering torque independent of each other and torque which is the summation of the output of both crankshafts.

A further object of this invention is to adapt the internal combustion engine capable of the above operation in a tractor or other vehicle so that the drive shaft is arranged to operate a single transmission and differential in order to actuate the tractor or other vehicle, thereby leaving the power shaft to operate a power take-off for coupling with various appurtenances.

Ancillary objects and features will become apparent in following the description of the illustrated forms of the invention.

Figure 4 is a bottom view of another modification of the invention, the differentiating features including the adaptation of the invention in an engine of the in-line type;

Figure 5 is a schematic view showing both groups of pistons being employed for operating the drive shaft of the vehicle, or the driven shaft with respect to the engine;

Figure 6 is a schematic view showing the arrangement when one group of pistons is employed to operate the driven shaft while the other group is employed to operate the power take-off through the power shaft;

Figure 7 is a schematic view showing the arrangement whereby one group of pistons is employed for actuating the driven shaft and the power shaft; and Figure 8 is a schematic view illustrating the condition existing when both groups of pistons are employed to operate both shafts, that is, the driven shaft and the power shaft.

Figure 1:
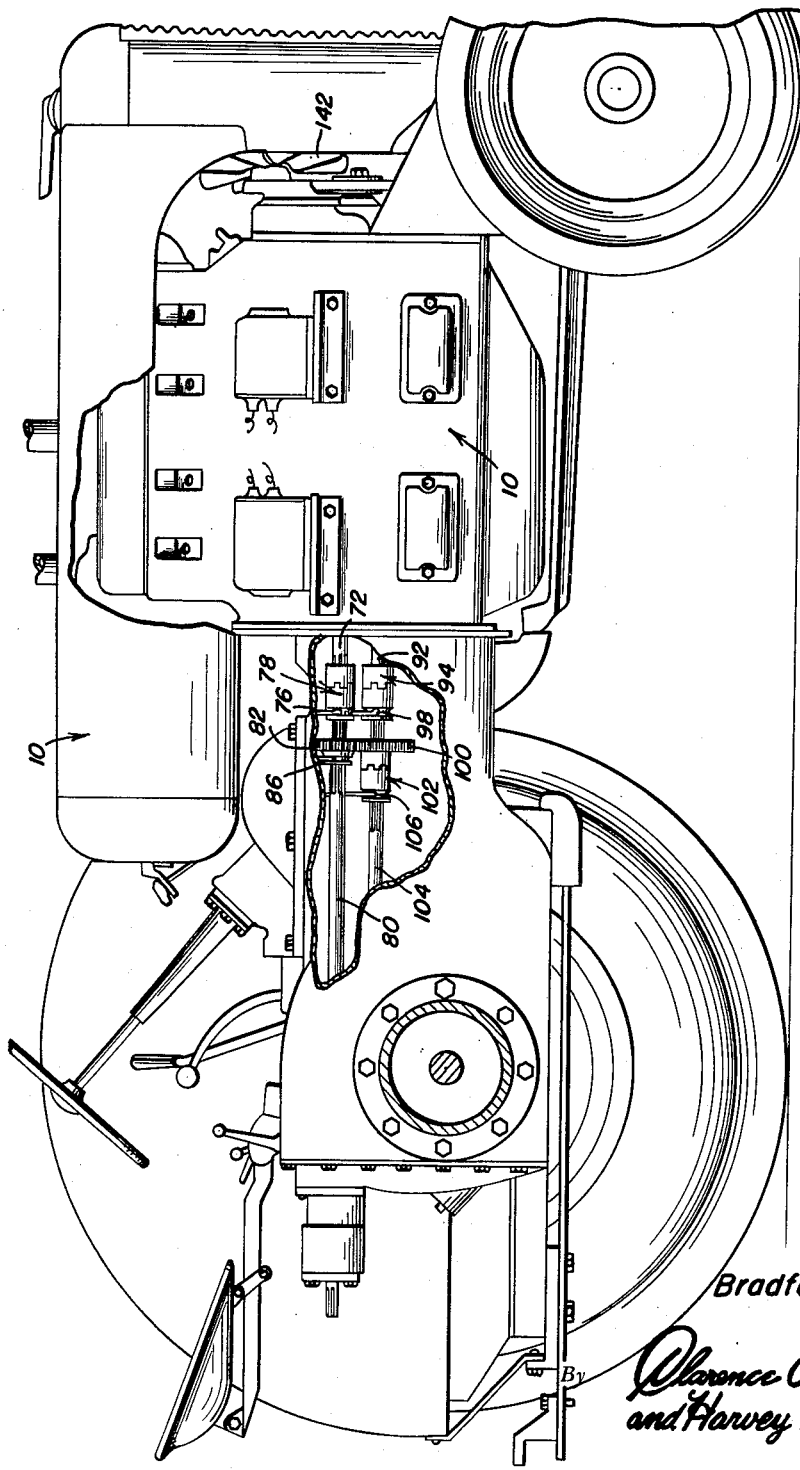
Figure 1 is an elevational view of a typical tractor with the invention incorporated therein, portions of the tractor being broken away to illustrate detail of construction.

The invention consists of improvements in internal combustion engine structure and arrangement for adaptation to a vehicle, as the illustrated tractor 10, whereby operation of the power take-off is obtained notwithstanding the operation of the tractor. Fuel economy is an important factor in vehicle operation, whether the vehicle is of the type employed in farming operations or whether the vehicle is any other type. Several arrangements have been resorted to in order to conserve fuel in the operation of farm equipment. To my knowledge, it is old to employ the same engine for operation of the tractor and operation of the power take-off, a clutch being provided for operating the power take-off independent of the movement of the vehicle. However, all during this period, the entire tractor engine is operative in order to actuate the power take-off. An engine designed to pull a tractor, the tractor usually towing some other piece of machinery, of necessity must be far larger than is necessary to operate a power take-off. Accordingly, in order to actuate an engine designed for a far greater load than is necessary, more fuel is used than is necessary when a power take-off only is employed.

The instant invention provides an arrangement in the actual engine structure whereby only a portion of said structure is employed under varying operation conditions regardless of these conditions. A selectivity of operation so as to leave the choice of how much of the engine is to be used, is left within the prerogative of the tractor operator, when the invention is employed in a tractor. In using the inventive principle in connection with other types of equipment, the choice will be left to the operator of that particular type of equipment.

To provide two independent engines to serve the same function as the instant invention is not practical due to the space limitation of a tractor. Moreover, the clutch arrangement becomes rather complex. As opposed to the two-engine system, the instant invention contemplates using a large number of the elements necessary in two engines, as two carburetors, two intake manifolds, two magnetos or distributors, together with spark coils, and two crankshafts. The instant invention avoids the necessity of two independent blocks, two independent cooling systems, exhaust systems including manifolds, oil pumps and other structural elements such as pans.

Moreover, by using a single block and rendering separate groups of pistons operative for working, one group or both groups may be employed to operate the tractor to a set or locale for performing an operation. Then, one of the groups of pistons may be rendered ineffectual, while the other is employed for operating the power shaft. Insofar as operation is concerned, substantially one-half of the useful taxable horsepower of the engine is used. If the load becomes too great, it is necessary only to put the other group of pistons to work.

Insofar as cooling is concerned, in that both groups of pistons are located in the same block, while one group is used, the other group region is of necessity heated to an appreciable degree. Starting of the second group is materially facilitated in this manner.

Figure 2:
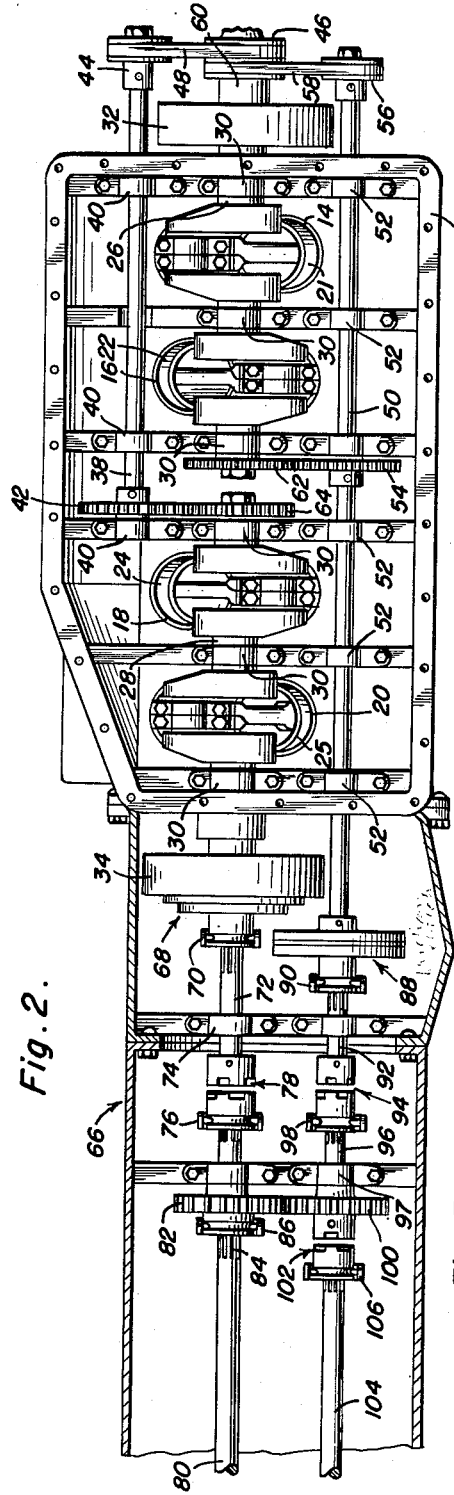
Figure 2 is a bottom view of one embodiment of the invention, illustrating the adaptation of the principle to a V-type block.

Each of the illustrated embodiments of the invention is as important as the other. Arbitrarily, the embodiment of the invention of Figure 2 is chosen for structural and operational description. A cylinder block 12 is provided with two groups of cylinders 14, 16 and 18, 20. The cylinders 14 and 16 make up a first group, while the cylinders 18 and 20 make up a second group. The cylinders 14 and 20 have their longitudinal axes in a single plane at an angle with respect to the vertical, while the cylinders 16 and 18 have their longitudinal axes in a plane intersecting the first-mentioned plane, causing a V-type arrangement. Each cylinder has a piston therein, the pistons 21 and 22 making up a first group and disposed in the cylinders 14 and 16, while the pistons 24 and 25 are disposed in the cylinders 18 and 20. Each piston has a connecting rod operatively connected therewith for attachment to the pair of crankshafts.

The crankshaft 26 has the pairs of pistons 21 and 22 operatively connected therewith, while the crankshaft 28 has the pairs of pistons 24 and 25 operatively connected therewith. The crankshafts are in longitudinal alignment in this instance and are carried by bearings 30. Any number of bearings may be employed as found necessary and as considered necessary from a design standpoint. A flywheel housing 32 is disposed in advance of the cylinder block 12 and has a flywheel connected with the crankshaft 26 disposed therein. A flywheel housing 34 is disposed rearwardly of the block 12 and has a flywheel disposed therein which is fixed to the crankshaft 28.

A lay shaft 38 is mounted in bearings 40 and has a gear 42 at one end thereof. A pulley 44 is disposed at the other end thereof for the purpose of operating the double sheave 46 through the pulley belt 48. A shaft 50 parallel to said shaft 38 is disposed in the block 12 and carried by conventional bearings 52, any number of which may be provided. A gear 54 is fixed to the shaft 50 intermediate its ends, and there is a pulley 56 secured to the outer end of said shaft 50. This pulley also drives the double sheave 46 through the medium of the belt 58. Because the shafts 50 and 38 may rotate at different speeds with respect to each other and because one of the shafts may be held stationary while the other is operating, a ratchet mechanism of conventional description is disposed in the housing 60 which is connected at the front end of the flywheel housing 32 and between that and the double sheave 46.

A gear 62 is secured to the crankshaft 26 and meshed with the gear 54. Thus, when the first group of pistons is operated, the shaft 50 is also actuated at a speed relative to the speed of the crankshaft 26, depending on the number of teeth in the gears 54 and 62.

A gear 64 is secured to the end of the crankshaft 28 and is enmeshed with the gear 42. Hence, when the crankshaft 28 is operated, the shaft 38 is also actuated a speed proportional to the speed of the crankshaft 28, depending upon the number of teeth on the gears 42 and 64, respectively.

A case, generally indicated at 66, is disposed at the rear of said cylinder block 12 and houses a number of structural elements. The crankshaft 28 continues through the rear wall of the cylinder block or through a partition depending below said cylinder block and after passing through an oil seal terminates in a clutch 68 which is preferably of the friction type. A clutch operating yoke 70 is used for engaging and disengaging the clutch members in order to couple or uncouple the splined shaft 72 alternately with the crankshaft 28. The shaft 72 is mounted in a bearing 74, any number of which may be employed. A clutch to be operated by the yoke 76 which is preferably of the tooth type and which is indicated at 78 couples the driven shaft 80 with the splined shaft 72. The driven shaft 80 is adapted to operate the single transmission in the tractor which, in turn, through a propeller shaft, actuates the rear wheels of the tractor through the differential. A sliding gear 82 forming a part of a gear train is disposed in the splines 84 of the driven shaft and is to be operated by the clutch operating yoke 86. The gear 82 simply slides axially of the driven shaft 80. As previously discussed, all of the shafts are mounted in suitable bearings so that they will rotate properly.

The shaft 50 has a friction clutch 88 operatively connected with the end opposite the pulley 56 and there is a yoke 90 employed to engage and disengage the clutch elements. Upon engagement of the clutch elements, the splined shaft 92 has torque applied thereto which is ultimately derived from the crankshaft 26. A mechanical clutch 94 is operatively connected with the splined shaft 92 and the shaft 96 which is supported in suitable bearings 97. The yoke 98 is used to actuate the mechanical clutch 94 so that torque from the crankshaft 26 is applied to the gear 100 which is fixed to the shaft 96. The gears 100 and 82 are enmeshed with each other, as disclosed in Figure 2, thereby forming a gear train. A mechanical clutch 102 is operatively connected with the shaft 96 in the rear of the gear 100 and the power take-off or power shaft 104. The yoke 106 is adapted for manual operation of the mechanical clutch 102.

For the operation of this form of the invention, together with the other two illustrated embodiments, attention is invited to Figures 5–8. The cylinder block 10 has the case or housing 66 extending from the rear thereof accommodating the described gear train, shafting and clutch arrangements. Torque derived from the crankshaft 26 is imparted to the shaft 50. If the clutch 88 is disengaged, the first crankshaft 26, together with the first group of pistons does no useful work insofar as operation of the power shaft is concerned. Similarly, if it is desired to employ the second group of pistons and the first group of pistons to operate the driven shaft 80 without operating the shaft 104, this may be accomplished. Adjustment as shown in Figure 5 attains this end. Torque is applied to the shaft 80 through the gear train including gears 82 and 100, through both the clutches 78 and 94 and through both friction clutches 68 and 88. At this time, the mechanical clutch 102 is in the disengaged condition so that the shaft 104 will simply float or rotate freely.

Under some operating conditions, one group of pistons may be used most satisfactorily for the purpose of imparting torque to the shaft 80, while the other group of pistons is used to impart torque to the shaft 104. This is accomplished by engaging all clutches (Figure 6) but moving the gears 82 and 100 to such condition that they are no longer enmeshed. At this time and under this operating condition, the first group of pistons operating the first crankshaft will impart torque to the shaft 102, while the second crankshaft imparts torque to the shaft 80.

It might well be that for light operations one group of pistons is all that is necessary (low horsepower used) to perform the operation of moving the tractor or other vehicle through the field or on a road and to perform an ancillary task accomplishable by operation of the power shaft 104. To this end, adjustment or regulation of the elements as disclosed in Figure 7 is made. The torque derived from the first crankshaft goes through the clutch 88 and to one element of the clutch 94 which is separated from the other element. Hence, if the first group of pistons is operative at all, it will impart no torque to the shaft 104. It will be necessary to use only an amount of fuel to maintain this first group of pistons operative so that this particular sub-engine is idling. Actually, this particular group of pistons and sub-engine may be rendered inoperative by the usual means, as cutting the ignition.

Torque from the crankshaft 28 is delivered through the clutches 68 and 78 and through the gear train including gears 82 and 100 so as to impart rotary movement to the shafts 80 and 104.

In instances wherein both crankshafts are to be used to deliver power to both shafts 80 and 104, all of the clutches are engaged as disclosed in Figure 8 and the gears 82 and 100 forming said gear train are enmeshed.

The above operation applies to each embodiment of the invention, there being a slightly different structural arrangement principally in relative positions of elements, the final operation of all embodiments of the invention being identical.

Figure 3:
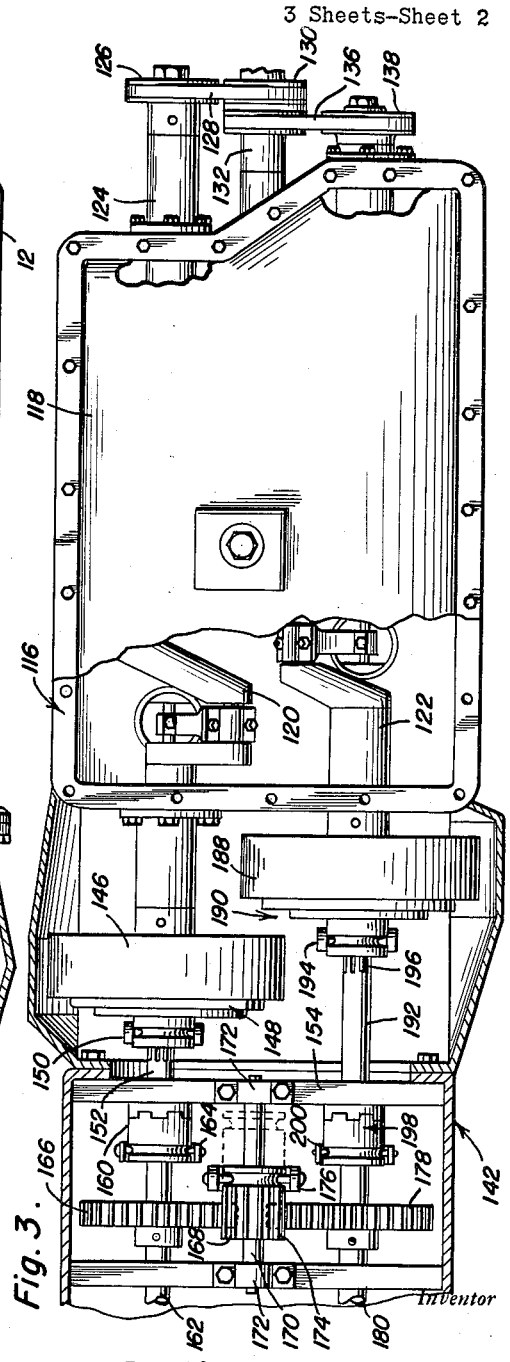
Figure 3 is a bottom view of another form of the invention, showing the adaptation of the principle to a multiple engine with the cylinders in parallel rows.

Reference is now made to Figure 3, wherein the second embodiment of the invention is illustrated. The cylinder block 116 is provided with a pan 118, portions of which are broken away to illustrate the two crankshafts 120 and 122, respectively. These crankshafts are parallel to each other and are in side-by-side relationship.

Each crankshaft has a number of pistons operatively connected therewith which are operable in cylinders provided in the cylinder block. Two groups of pistons are used, one group being connected with the crankshaft 120 and the other group being connected with the crankshaft 122.

At the front of the cylinder block, the crankshaft extends forwardly through a sleeve 124 and has a pulley 126 fixed thereto. A belt 128 is disposed around the pulley 126 and also around a double sheave 130. The double sheave 130 is mounted for rotation on a shaft, the shaft being disposed in a ratchet gear box 132 having a ratchet mechanism therein which is purely conventional and which permits the sheave 130 to be operated by either the belt 128 or the belt 136, depending on which belt is operating faster.

The belt 136 is entrained around a pulley 138 which is fixed to the outer end of the crankshaft 122. A fan 140 is secured to the double sheave 130 or is, in the conventional way, operated off one of the belts.

A case or housing 142 is disposed in the rear of the cylinder block 116 and has a flywheel housing 146 disposed therein whereby a flywheel connected with the shaft 120 is housed. A clutch 148, preferably of the friction type, is operatively connected with the conventional pressure head associated with the flywheel, and the yoke 150 is used to engage and disengage the clutch elements. A length of shaft 152 is mounted in suitable bearings carried by the partition 154 in the housing 142 and it is on this shaft that the splined part of the clutch operating element slides. A mechanical clutch 160 is disposed on the shaft 152 and also on the inner end of the driven shaft 162 which is analogous to the shaft 80, serving the same purpose as the shaft 28. A yoke 164 is employed for operation of the mechanical clutch 160.

A gear 166 which forms a part of a gear train is fixed to a shaft 162 and is enmeshed by the pinion 168 which is mounted on the lay shaft 170. This lay shaft is carried in bearings 172 and has a pinion 174 slidable thereon axially of the lay shaft 170 and operable by means of the yoke 176.

The pinion 168 forms a part of the above mentioned gear train, as does the gear 178 which is pinned or otherwise rigidly fixed to the shaft 180 which serves the same purpose as the power take-off shaft or power shaft 104.

In the previous embodiment, where it was necessary to move one of the two gears to disengage the gears 82 and 100, in this embodiment of the invention the gear train consists of three gears and it is necessary to operate the pinion on the shaft 170 and axially of said shaft 170 to cause the gear train to be complete. As a necessary result, the shafts 162 and 180 will not be actuated in opposite directions from each other as will be the case in the embodiment of the invention of Figures 2 and 4.

The flywheel 188 is disposed in the case 142 and is fixed to the crankshaft 122. A clutch 190 of the friction type is operatively connected with the pressure head associated with said flywheel. This clutch is to be rendered effectual or ineffectual for coupling the shaft 192 for driving connection with the crankshaft 122 by means of the yoke 194 which slides a part of the clutch on the splines 196 of the shaft 192. The power shaft 180 which has the gear 178 thereon has splines (unshown) at the inner end thereof on which one element of the mechanical clutch 198 is operable. A yoke 200 is employed to operate the mechanical clutch 196, releasably coupling the clutch parts of the mechanical clutch 196 together so as to impart rotary movement to the shaft 180 from the shaft 192.

Reference is now made to the embodiment of the invention in Figure 4. The cylinder block, generally indicated at 210, is provided with a number of cylinders which are in line. For facility of operation, a straight type-four cylinder engine block is shown, although multiples of various numbers of cylinders may be used. The first group of pistons, each of which is indicated at 212, is operatively connected with the crankshaft 214 which is mounted in bearings 216. The flywheel 218 is disposed in advance of the cylinder block 210 and the shaft 214 in advance of the flywheel 218 has a conventional ratchet mechanism 220 operatively connected therewith, and on which the double sheave 222 is mounted. This double sheave has a pair of belts 224 and 226 entrained therearound, these belts being also entrained around pulleys 228 and 230, respectively. The pulley 228 is secured to the lay shaft 232, mounted in bearings 234. The shaft 232 is parallel to the crankshaft 214 and it has a gear 236 at its inner end enmeshed with a gear 238.

A shaft 240 is mounted in bearings 242 and is disposed in part within the cylinder block 210. The outer end of the shaft 240 carries the pulley 230 for rotation. Intermediate the ends of the shaft 240 there is a gear 248 which is enmeshed with the gear 250. The gear 250 is fixed to the inner end of the crankshaft 214, while the gear 238 is fixed to the outer end of the crankshaft 254.

The crankshaft 254 has pistons 256 secured thereto by means of connecting rod bearings, there being two of these pistons provided, forming a group. Thus, as the crankshaft 254 is operated, the shaft 232 is operated through the gears 238 and 236, whereby operation of the pulley 228 takes place. As the crankshaft 214 is operated, the shaft 240 is also actuated through the gears 250 and 248, as is the pulley 230.

Formed as a continuation of the crankshaft 254 is a splined shaft 260, which is mounted in suitable bearings 262 carried by the partition 264 of the case 266. This case is disposed in the rear of the engine cylinder block 210 and is held in place by any adaptable means such as bolts.

A friction-type clutch 268 is operatively connected with the pressure head associated with the flywheel of the shaft 254 and which is mounted in a housing 270. A yoke 272 is operatively connected with one of the parts of the friction clutch 268 so as to render it in engagement and disengagement. When the splined shaft 260 is rendered operative, the shaft 274 is actuated at such time that the mechanical clutch 276 is arranged to impart torque from the shaft 260 to the shaft 274. The yoke 278 is employed for the purpose of moving the parts of the mechanical clutch 276 together and spaced from each other.

A train of gears including the gear 280 is provided in association with the shaft 274 and in association with the shaft 282. The driven shaft 284, which is analogous in function to the shaft 80 and the driven shaft 162, is supplied in mechanical connection with the gear 280, as by the splines 286. The yoke 288 is used to slide the gear 280 in the splines 268 so that the gear is selectively drivingly connected with the gear 290 and disconnected therewith or moved to an out-of-mesh condition.

The shaft 240 has a friction clutch 292 at its outer end which couples this shaft with the splined shaft 294. The yoke 296 is provided for the purpose of moving the elements of the clutch 292 against each other and away from each other so that the shafts 240 and 294 may be selectively coupled and uncoupled.

Said shaft 282 has a mechanical clutch 296, as the tooth type, operatively connected therewith and it is also operatively connected with the shaft 294. The yoke 298 is employed for the purpose of moving the parts of the mechanical clutch 296 together and away from each other so that this clutch may be rendered operative and inoperative.

The power shaft or power take-off shaft 300 which is directly analogous to the shaft 104 and the shaft 180 is provided with a splined inner end so that the mechanical clutch 302 is operable thereon. The yoke 304 is used for the purpose of sliding the various parts of the mechanical clutch 302 into engagement whereby coupling of the power shaft 300 with the splined shaft 282 takes place.

Having described the invention, what is claimed as new is:

In a vehicle which has a single differential and a single transmission, the improvement which comprises an internal combustion engine to actuate the vehicle through the transmission and differential, said engine including a first and a second crankshaft, a driven shaft arranged to actuate the transmission, means releasably connecting said driven shaft with said first and said second crankshaft, a power shaft, means releasably connecting said power shaft for operation with said first and second crankshaft, said connecting means including a plurality of clutches, and a gear train consisting of gears arranged to be adjusted to an out-of-mesh condition.

References Cited in the file of this patent

UNITED STATES PATENTS

| Number | Name | Date |
|---|---|---|
| 845,850 | Carter | Mar. 5, 1907 |
| 1,019,283 | Surcouf | Mar. 5, 1912 |
| 1,386,489 | Birkigt | Aug. 2, 1921 |
| 2,075,741 | Miller | Mar. 30, 1937 |
| 2,297,214 | Gosslau | Sept. 29, 1942 |
| 2,300,977 | Schlaepfer | Nov. 3, 1942 |
| 2,310,269 | Waeber | Feb. 9, 1943 |
| 2,419,811 | Beall | Apr. 29, 1947 |
| 2,505,856 | Gregory | May 2, 1950 |

FOREIGN PATENTS

| Number | Country | Date |
|---|---|---|
| 113,655 | Sweden | Mar. 27, 1945 |
| 309,400 | Germany | Nov. 21, 1918 |